US009118391B2

(12) United States Patent
Gauthier (10) Patent No.: US 9,118,391 B2
(45) Date of Patent: Aug. 25, 2015

(54) INTEGRATED CIRCUIT DEVICE, WIRELESS COMMUNICATION UNIT AND METHOD OF MANUFACTURE THEREFOR

(75) Inventor: Laurent Gauthier, Pins Justaret (FR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/824,959

(22) PCT Filed: Oct. 15, 2010

(86) PCT No.: PCT/IB2010/003022
§ 371 (c)(1),
(2), (4) Date: Mar. 18, 2013

(87) PCT Pub. No.: WO2012/049529
PCT Pub. Date: Apr. 19, 2012

(65) Prior Publication Data
US 2013/0189937 A1    Jul. 25, 2013

(51) Int. Cl.
*H04B 1/38* (2006.01)
*H04B 1/28* (2006.01)
*H04B 1/40* (2015.01)
(Continued)

(52) U.S. Cl.
CPC ............... *H04B 1/40* (2013.01); *H04B 1/406* (2013.01); *H04B 7/0413* (2013.01)

(58) Field of Classification Search
CPC ............. H04B 1/04; H04B 1/40; H04B 1/44; H04B 1/0064; H04Q 2209/60; H04W 24/00
USPC ........... 455/73, 78, 79, 82, 84, 101, 269, 272, 455/273, 277.1, 277.2, 333
See application file for complete search history.

(56) References Cited

U.S. PATENT DOCUMENTS

| 6,433,742 B1 * | 8/2002 | Crawford ............... 343/700 MS |
| 7,519,390 B2 * | 4/2009 | Malone et al. .................. 455/78 |

(Continued)

FOREIGN PATENT DOCUMENTS

| CN | 101401317 | 9/2012 |
| EP | 1976133 A1 | 10/2008 |

(Continued)

OTHER PUBLICATIONS

SEMTECH Advanced Communications & Sensing: "Low Power Integrated UHF Transceiver" XS1231 Transceiver, Rev 4—Nov. 2010, pp. 1-84.

(Continued)

*Primary Examiner* — Quochien B Vuong (57) ABSTRACT

An integrated circuit device comprising at least one radio frequency (RF) transceiver module. The at least one RF transceiver module includes a plurality of low noise amplifiers (LNAs) operably coupled to external contacts of the integrated circuit device and arranged to receive an RF signal from the respective external contact, amplify the received RF signal, and to output the amplified RF signal. Each transceiver module further includes a plurality of power amplifier (PA) modules operably coupled to the external contact of the integrated circuit device, and arranged to receive an RF signal to be transmitted, amplify the received RF signal to be transmitted, and output the amplified signal. The plurality of LNAs and the plurality of PAs are selectively configurable to operate in at least a first, multi-antenna configuration and a second, single antenna high transmit power configuration.

12 Claims, 6 Drawing Sheets

(51) Int. Cl.
*H04B 1/403* (2015.01)
*H04B 7/04* (2006.01)

(56) References Cited

U.S. PATENT DOCUMENTS

| | | | | |
|---|---|---|---|---|
| 7,636,554 | B2 * | 12/2009 | Sugar et al. | 455/73 |
| 7,848,714 | B2 * | 12/2010 | Takeda et al. | 455/91 |
| 8,130,787 | B2 | 3/2012 | Hagiwara et al. | |
| 8,634,782 | B2 * | 1/2014 | Asuri et al. | 455/101 |
| 8,660,041 | B2 * | 2/2014 | Niskanen et al. | 370/278 |
| 2006/0250182 | A1 | 11/2006 | Takeda et al. | |
| 2008/0299930 | A1 | 12/2008 | Rofougaran | |
| 2012/0099474 | A1 | 4/2012 | Gauthier | |

FOREIGN PATENT DOCUMENTS

| | | |
|---|---|---|
| JP | 09-289500 | 11/1997 |
| JP | H09289500 A | 11/1997 |
| JP | 2002-300096 | 10/2002 |
| JP | 2002300096 A | 10/2002 |
| JP | 2006-311485 | 11/2006 |
| JP | 2006311485 A | 11/2006 |

OTHER PUBLICATIONS

International Search Report and Written Opinion correlating to PCT/IB2010/003022 dated Jun. 7, 2011.

* cited by examiner

INTEGRATED CIRCUIT DEVICE, WIRELESS COMMUNICATION UNIT AND METHOD OF MANUFACTURE THEREFOR

FIELD OF THE INVENTION

This invention relates to an integrated circuit device, a wireless communication unit and a method for manufacturing a wireless communication unit.

BACKROUND OF THE INVENTION

Energy deregulation and market-driven pricing have both lead to a desire to match energy consumption with energy generation. Traditional meters to measure energy consumption provide a view of the consumption over a certain period; however, they provide no indication of the consumption at a particular time. To address this, 'Smart Meters' have been developed to allow dynamic processing of the consumed energy depending on the energy pricing at any time.

A smart meter is typically incorporated inside a global network of user-data repositories for an energy provider to access. It has been found that a radio frequency (RF) network is often the most practical method of updating existing user-data repositories. Smart Energy metering has been installed in some test cities. However, it is thought that in order to be widely accepted, Smart Energy Metering will likely have to be defined around a commonly accepted RF standard, which may allow the development of dedicated low cost solutions.

At present, there is no universal standard for smart energy metering, although a standard is currently in the process of being defined by IEEE association. However, any resulting standard will need to be flexible, since the requirements are complex and not yet fully defined. Furthermore, implementation of a resulting standard will necessarily differ between countries, due to variations in national frequency and technology requirements/restrictions. For example, in the United States of America, compliance with IEEE802.15.4(g) will be mandatory, with high power transmission being allowed in the 900 MHz band. However, in Europe, power restrictions prevent a use of high power transmission and as such other standards may be adopted, such as M-Bus (Meter-Bus) is a European standard (EN 13757-2 physical and link layer, EN 13757-3 application layer) for the remote reading of gas or electricity meters). Other proprietary protocols may also be adopted in some countries.

Antenna diversity, also known as space diversity, is any one of several wireless diversity schemes that use two or more antennas to improve the quality and reliability of a wireless link. Often, especially in urban and indoor environments, there is not a clear line-of-sight (LOS) communication path between transmitter and receiver. Instead, transmitted signals are reflected along multiple paths before finally being received. Each of these reflections can introduce phase shifts, time delays, signal attenuations, and even distortions that can destructively interfere with one another at the aperture of the receiving antenna. Antenna diversity is especially effective at mitigating these multipath situations. This is because multiple antennas offer a receiver several observations of the same signal. Each antenna will experience a different interference environment. Thus, if one antenna element is experiencing a deep signal fade, it is likely that another antenna element has a sufficient signal. Collectively, such an antenna diversity system can provide a robust link. Whilst this technique is primarily used in receiving systems (diversity reception), it has also proven valuable for transmitting systems (transmit diversity). Accordingly, the use of antenna diversity for applications such as smart energy metering is desirable.

However, antenna diversity is not compatible with all potential technologies that are likely to be adopted throughout the various countries in which smart energy metering will be implemented. For example, as previously mentioned, high-power transmission is likely to be required in the United States of America, which is generally incompatible with antenna diversity techniques since a different amplifier circuit is required to provide the necessary power, thereby causing impedance matching incompatibility between the different amplifier circuits and the antenna. A known technique for providing high transmit power is use two power amplifier modules operably coupled in parallel. At present, in order to enable both antenna diversity and high transmission power to be provided within a single device, distinct and separate RF modules would be required to support the different technologies, which would be prohibitively costly and undesirable.

As such, it is currently necessary for distinct RF products to be developed for the separate technologies that may be implemented, and specifically for the separate 'antenna diversity' and 'high power transmission' markets.

SUMMARY OF THE INVENTION

The present invention provides an integrated circuit device, a wireless communication unit and a method for manufacturing a wireless communication unit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

A difficulty in designing current transceiver architectures is a desire for both transmitter (TX) and receiver (RX) circuitry to be coupled to/work on a same (common) antenna. A known solution is to design both the power amplifier (PA) and low noise amplifier (LNA) for two different optimum impedances, thereby providing more flexibility for the IC designer. The equipment designer may then match these two impedances to the antenna with two different matching networks. Antenna connection is then performed using an RF antenna switch that can be either part of the IC or an additional element coupleable thereto.

While this approach is commonly found in many current transceivers, the present invention focuses on developing a low power and low cost solution according to a different philosophy. To reduce part count, a common matching network is designed, which allows the RF antenna switch to be removed. In this design, the LNA and the PA are configured in parallel using a common IC pin. This reduces IC design flexibility but it provides great advantages for equipment designer. In one example embodiment, the LNA and the PA may be designed to operate using the same optimum impedance.

The present invention will now be described with reference to transceiver units adapted to enable smart energy metering (remote metering). However, it will be appreciated that the present invention is not limited to such applications, and may be equally applicable to other applications in which the ability to configure radio frequency (RF) transceiver circuitry at the fabrication stage is advantageous and/or desirable, for example as a result of variations in national/regional requirements/restrictions, etc. It is contemplated that such alternative applications may include, by way of example only, security and/or alarm systems, home automation applications, etc.

Figure 1:
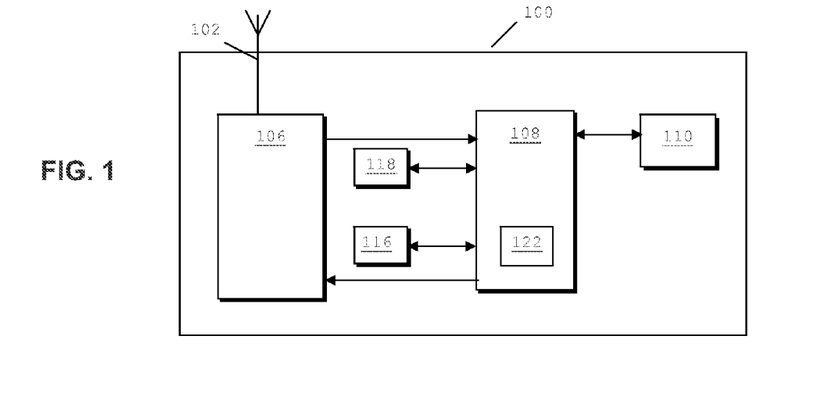
FIG. 1 illustrates an example of a simplified block diagram of part of a wireless communication unit.

Referring to FIG. 1, there is illustrated an example of a simplified block diagram of part of a wireless communication unit 100 adapted to support the inventive concept of an example of the present invention. The wireless communication unit 100, in the context of the illustrated example embodiment of the present invention, comprises a transceiver unit adapted to enable smart energy metering (remote metering). As such, the wireless communication unit 100 comprises an antenna 102 and a variety of well known radio frequency components or circuits 106, operably coupled to the antenna 102. The wireless communication unit 100 further comprises signal processing logic 108. The signal processing logic 108 is operably coupled to input/output components 110, such as metering components and a suitable user interface (UI) comprising, for example, a display, keypad, etc. For completeness, the signal processing logic 108 is coupled to a memory element 116 that stores operating regimes, such as decoding/encoding functions and the like and may be realised in a variety of technologies, such as random access memory (RAM) (volatile), (non-volatile) read only memory (ROM), Flash memory or any combination of these or other memory technologies. A timer 118 is typically coupled to the signal processing logic 108 in order to control a timing of operations within the wireless communication unit 100.

Referring now to FIGS. 2 to 10, there is illustrated an example of an integrated circuit device 200 adapted in accordance with some example embodiments of the present invention. The integrated circuit device 200 may comprise, for example, a radio frequency integrated circuit (RFIC) such as may be used to implement at least a part of the radio frequency components or circuits 106 of the wireless communication unit 100 of FIG. 1. As such, the integrated circuit device 200 comprises an RF transceiver module 210.

Figure 2:
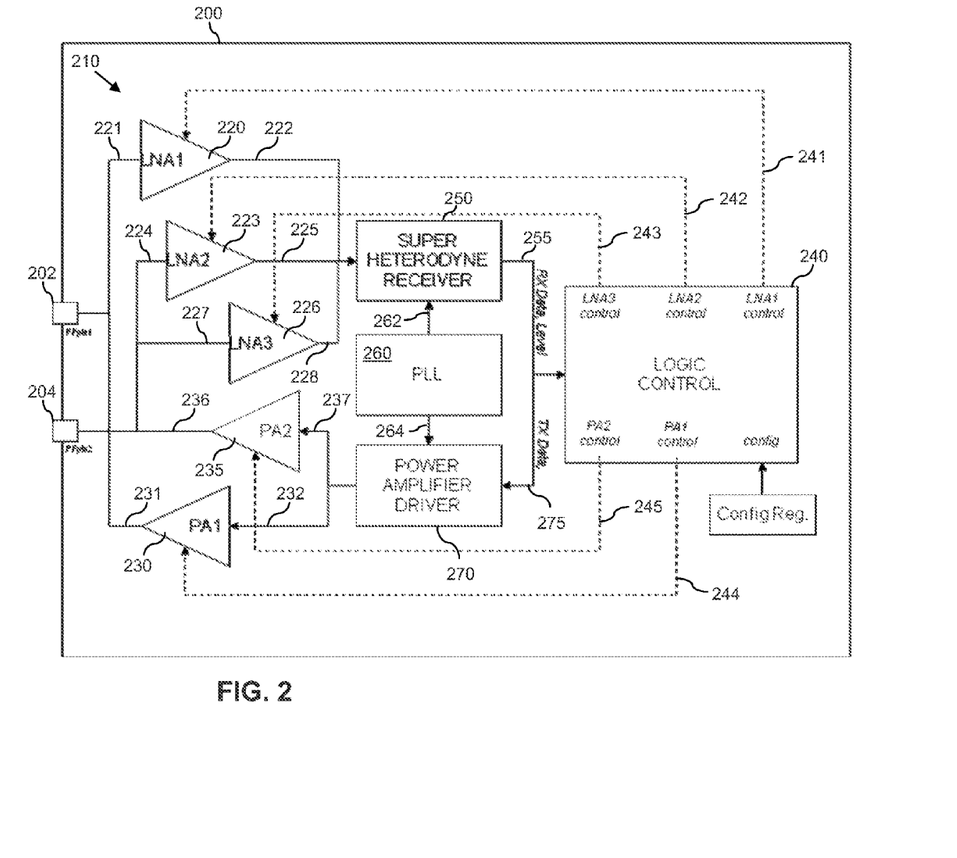
FIG. 2 illustrates an example of an integrated circuit device.

The RF transceiver module 210 comprises a plurality of low noise amplifier (LNA) modules 220, 223, 226 operably coupled at inputs 221, 224, 227 thereof to external contacts 202, 204 of the integrated circuit device. In use, the LNA modules 220, 223, 226 are arranged to receive an RF signal from the respective external contact 202, 204, amplify the received RF signal, and to output 222, 225, 228 the amplified RF signal. The outputs 222, 225, 228 of the LNA modules 220, 223, 226 are operably coupled to a receiver module, which for the illustrated example comprises a super-heterodyne receiver 250, which receives amplified RF signals from the LNA modules 220, 223, 226, and performs demodulation and decoding of the received signals to extract data therefrom. The extracted data is then provided to a control module 240, as illustrated generally at 255.

The RF transceiver module 210 further comprises a plurality of power amplifier (PA) modules 230, 235 operably coupled at outputs 231, 236 thereof to the external contacts 202, 204 of the integrated circuit device 200, and in use arranged to receive at inputs 232, 237 thereof an RF signal to be transmitted, amplify the RF signal to be transmitted, and output 231, 236 the amplified signal to be transmitted. The inputs of the PAs 230, 235 are operably coupled to a PA driver 270, which for the illustrated example is arranged to receive, from the control module 240, data to be transmitted (as illustrated generally at 275), perform encoding of the data to be transmitted and modulation of an RF signal to convey the encoded data, and to provide the modulated RF signal to the PAs 230, 235 to be amplified.

For completeness, the transceiver module 210 of the illustrated example further comprises a phase locked loop (PLL) 260 arranged to generate timing reference signals 262, 264 for the receiver 250 and PA driver 270 respectively.

The plurality of LNAs 220, 223, 226 and the plurality of PAs 230, 235 are selectively configurable to operate in at least a first, multi-antenna configuration and a second, single antenna high transmit power configuration. For example, for the illustrated example the transceiver module 210 comprises two PAs 230, 235 which may be selectively configured to operate in a single antenna high transmit power configuration whereby an RF signal to be transmitted is amplified by both of the PAs 230, 235. The amplified signals output by the two PAs 230, 235 may then be combined to provide a high transmit power signal.

For the illustrated example, the control module 240 is configurable to selectively configure the plurality of LNAs 220, 223, 226 and the plurality of PAs 230, 235 to operate in a required transceiver configuration. As such, the control module 240 is operably coupled to each of the LNAs 220, 223, 226 and PAs 230, 235 by way of control signals 241, 242, 243, 244, 245 respectively.

In accordance with some example embodiments of the present invention, the plurality of LNAs 230, 233, 236 and the plurality of PAs 230, 235 may be selectively configurable to operate in at least one from a group of:
  a dual antenna transceiver configuration;
  a single antenna, higher transmit power, transceiver configuration; and
  a single antenna, lower transmit power, transceiver configuration.

Figure 3:
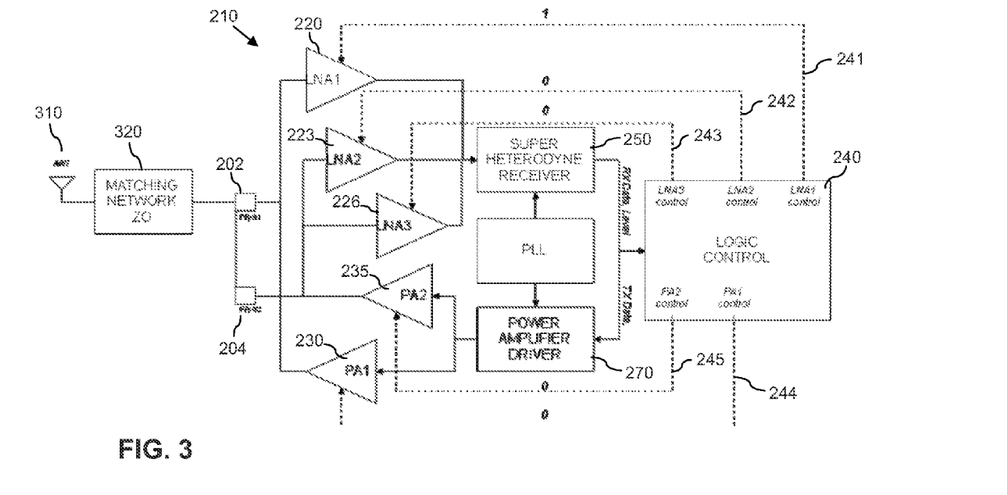
FIGS. 3 to 10 illustrate examples of transceiver module configuration for the integrated circuit device of FIG. 2.
Figure 4:
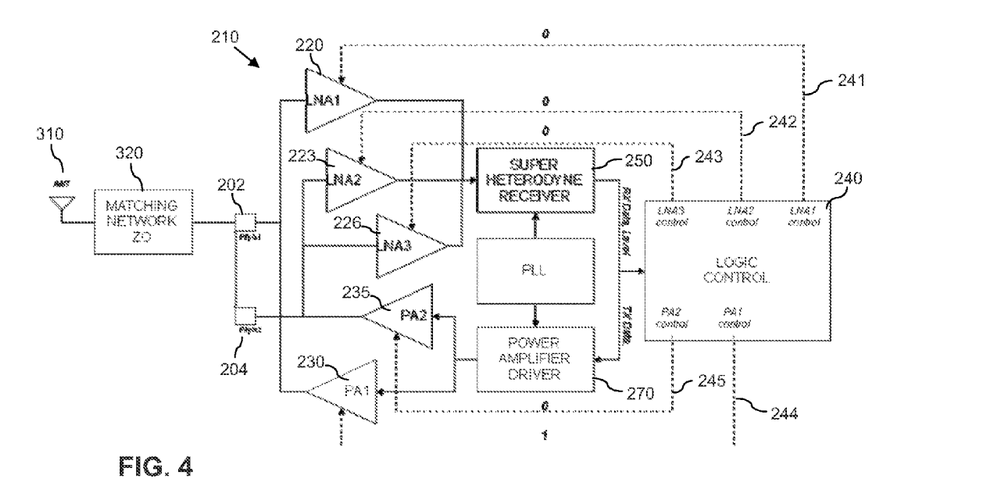

FIGS. 3 and 4 illustrate an example of the transceiver module 210 configured to operate in a single antenna, lower transmit power transceiver configuration. For the illustrated example, the transceiver module 210 comprises a first LNA 220 operably coupled at an input 221 thereof to a first external contact 202 of the integrated circuit device 200, and selectively configurable to receive an RF signal from the first external contact 202, amplify the received RF signal from the first external contact 202, and to output 222 the amplified signal. The transceiver module 210 of the illustrated example further comprises a first PA 230 operably coupled at an output 231 thereof to the first external contact 202 of the integrated circuit device 200, and selectively configurable to receive at an input 232 thereof an RF signal to be transmitted, amplify the received RF signal to be transmitted, and output 231 to the first external contact 202 the amplified signal. An antenna 310 is operably coupled to the first external contact 202 via an impedance matching circuit 320.

FIG. 3 illustrates the transceiver module 210 configured to receive RF signals from the single antenna 310. The first LNA 220 is configured by the control module 240, via control signal 241, to receive an RF signal from the antenna 310 via the first external contact 202, amplify the received RF signal and to output the amplified signal to the receiver 250. The remaining LNA modules 223, 226 and the PA modules 230, 235 are effectively 'disabled' by the control module 240 via control signals 242, 243, 244, 245.

FIG. 4 illustrates the transceiver module 210 configured to transmit RF signals via the single antenna 310. The first PA 230 is configured by the control module 240, via control signal 244, to receive at an input 232 thereof an RF signal to be transmitted, amplify the received RF signal and output to the antenna 310, via the external contact 202, the amplified signal. The LNAs 220, 223, 226 and the remaining PA 235 are effectively 'disabled' by the control module 240 via control signals 241, 242, 243, 245.

Thus, as illustrated in FIGS. 3 and 4, the transceiver module 210 is capable of being selectively configured, by way of the control module 240, to transmit and receive RF signals via a single antenna 310. In order to optimise the efficiency of the transceiver circuitry, the first LNA 220 and the first PA 230 in the illustrated example may be arranged to comprise compatible (e.g. substantially equal) impedances with respect to the first external contact 202. In this manner, the impedance matching circuit 320 may be configured to match a single (common) impedance Z0 for both the first LNA 220 and the first PA 230.

FIGS. 5 to 8 illustrate an example of the transceiver module 210 configured to operate in a dual-antenna transceiver configuration. For the illustrated example, the transceiver module 210 further comprises a second LNA 223 operably coupled at an input 224 thereof to a second external contact 204 of the integrated circuit device 200, and selectively configurable to receive an RF signal from the second external 204, amplify the received RF signal from the second external contact 204, and to output 225 the amplified RF signal. The transceiver module 210 further comprises a second PA 235 operably coupled at an output 236 thereof to the second external contact 204 of the integrated circuit device 200, and selectively configurable to receive at an input 237 thereof an RF signal to be transmitted, amplify the received RF signal to be transmitted, and output 236 to the second external contact 204 the amplified signal. A first antenna 510 is operably coupled to the first external contact 202 via first impedance matching circuit 520. A second antenna 530 is operably coupled to the second external contact 204 via a second impedance matching circuit 540.

Figure 5:
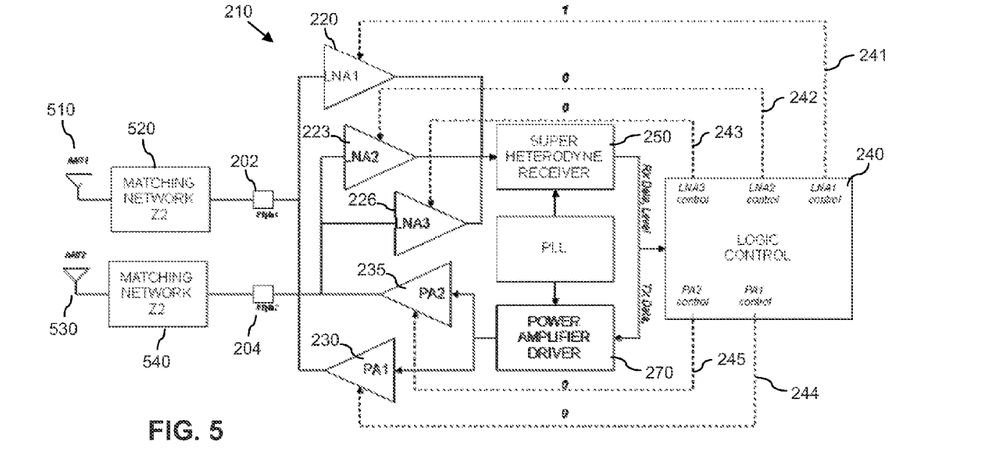

FIG. 5 illustrates the transceiver module 210 configured to receive RF signals from the first antenna 510. The first LNA 220 is configured by the control module 240, via control signal 241, to receive an RF signal from the first antenna 510 via the first external contact 202, amplify the received RF signal and to output the amplified signal to the receiver 250. The remaining LNAs 223, 226 and the PAs 230, 235 are effectively 'disabled' by the control module 240 via control signals 242, 243, 244, 245.

Figure 6:
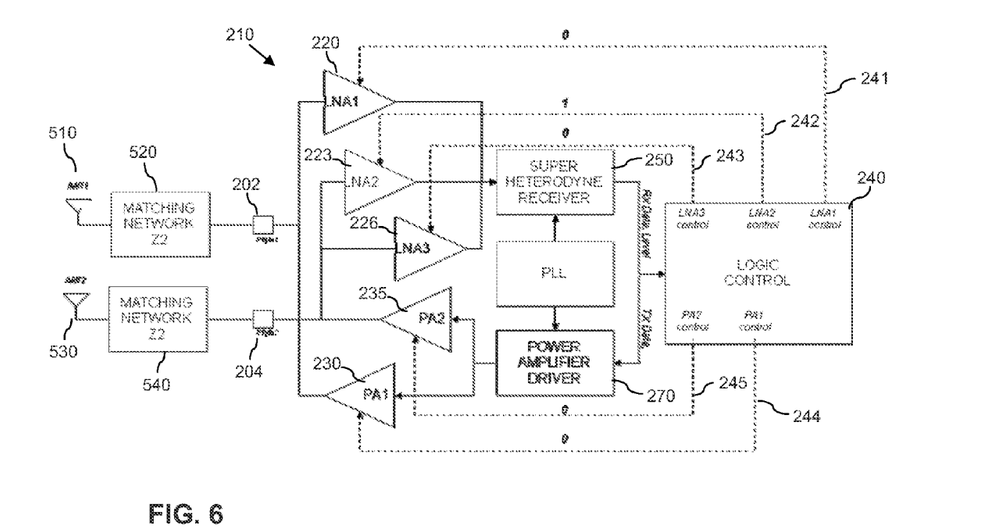

FIG. 6 illustrates the transceiver module 210 configured to receive RF signals from the second antenna 530. The second LNA 223 is configured by the control module 240, via control signal 242, to receive an RF signal from the second antenna 530 via the second external contact 204, amplify the received RF signal and to output the amplified signal to the receiver 250. The remaining LNAs 220, 226 and the PAs 230, 235 are effectively 'disabled' by the control module 240 via control signals 241, 243, 244, 245.

Figure 7:
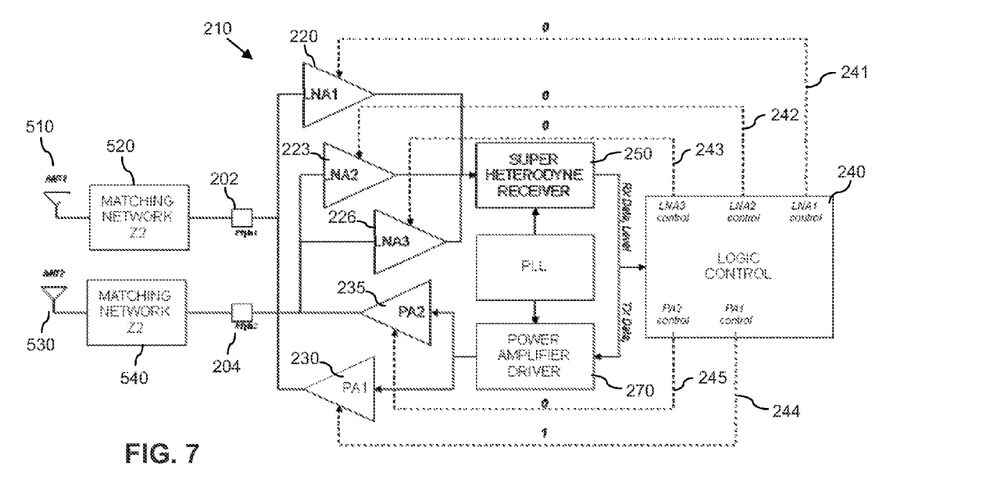

FIG. 7 illustrates the transceiver module 210 configured to transmit RF signals via the first antenna 510. The first PA 230 is configured by the control module 240, via control signal 244, to receive at an input 232 thereof an RF signal to be transmitted, amplify the received RF signal and output to the first antenna 510, via the first external contact 202, the amplified signal. The LNAs 220, 223, 226 and the remaining PA module 235 are effectively 'disabled' by the control module 240 via control signals 241, 242, 243, 245.

Figure 8:
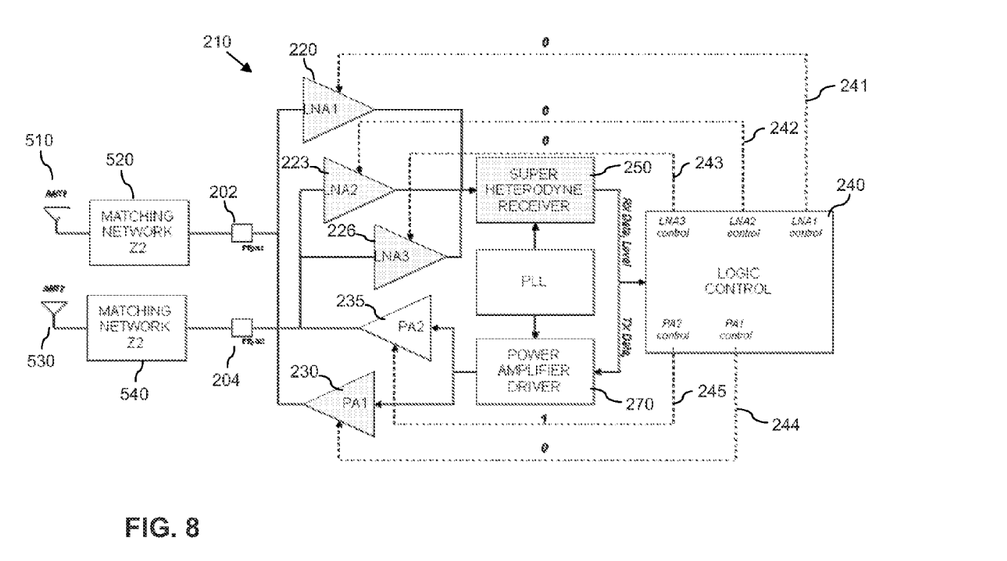

FIG. 8 illustrates the transceiver module 210 configured to transmit RF signals via the second antenna 530. The second PA 235 is configured by the control module 240, via control signal 245, to receive at an input 237 thereof an RF signal to be transmitted, amplify the received RF signal and output to the second antenna 530, via the second external contact 204, the amplified signal. The LNAs 220, 223, 226 and the remaining PA module 230 are effectively 'disabled' by the control module 240 via control signals 241, 242, 243, 244.

Thus, as illustrated in FIGS. 5 to 8, the transceiver module 210 is capable of being selectively configured, by way of the control module 240, to transmit and receive RF signals via two antennas 510, 530, such as may be implemented within an antenna diversity system. In order to optimise the efficiency of the transceiver circuitry, the second LNA 223 and the second PA 235 may also be arranged to comprise compatible (e.g. substantially equal) impedances with respect to the second external contact 204, in addition to the first LNA 220 and the first PA 230 being arranged to comprise compatible (e.g. substantially equal) impedances with respect to the first external contact 202. In this manner, the impedance matching circuits 520, 540 may each be configured to match a single (common) impedance (Z2) for both their respective LNAs 220, 223 and PAs 230, 235.

In one example, the second LNA 223 and the second PA 235 may equally be configured to operate in a single antenna, lower transmit power transceiver configuration, in a similar manner to the first LNA 220 and first PA 230 as illustrated in FIGS. 3 and 4.

Figure 9:
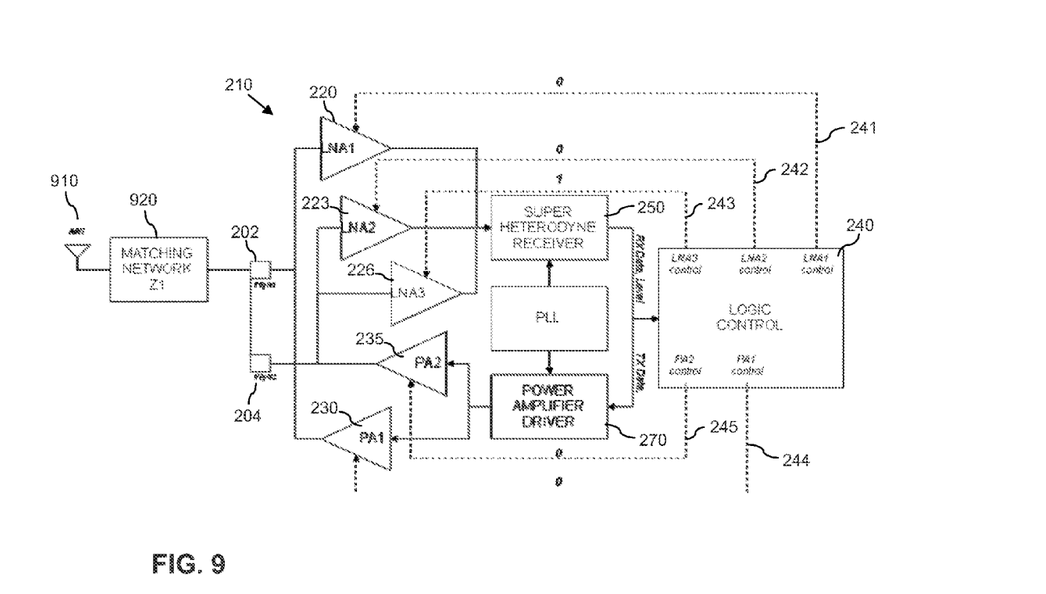
Figure 10:
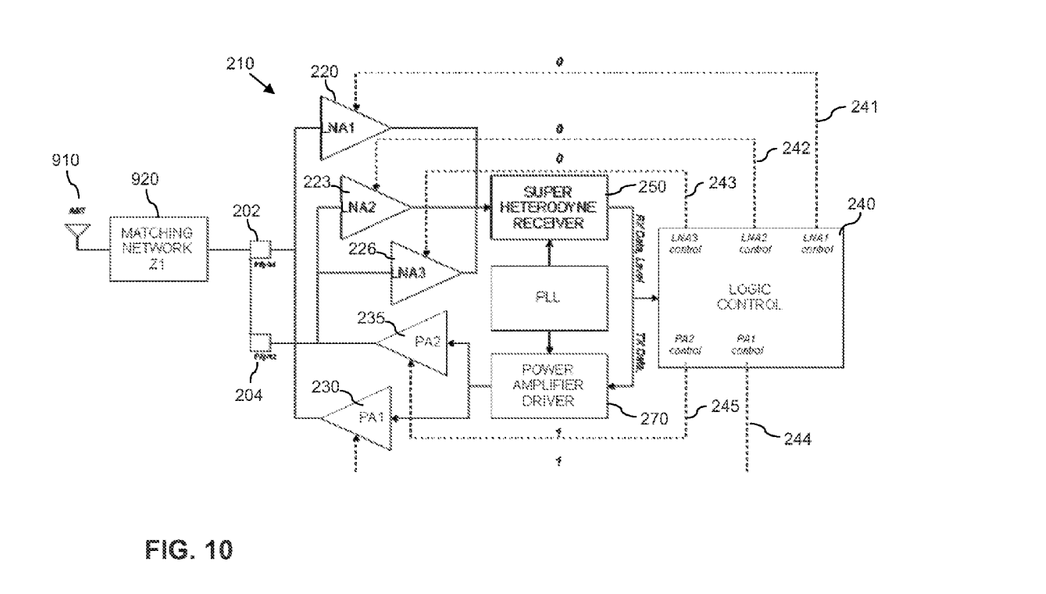

FIG. 9 and FIG. 10 illustrate an example of the transceiver module 210 configured to operate in a single antenna, higher transmit power transceiver configuration. For the illustrated example, the transceiver module 210 further comprises a third LNA 226 operably coupled at an input 227 thereof to the second external contact 204 of the integrated circuit device 200, and selectively configurable to receive an RF signal from the second external 204, amplify the received RF signal from the second external contact 204, and to output 228 the amplified RF signal. A single antenna 910 is operably coupled to the first and second external contacts 202 via an impedance matching circuit 920.

FIG. 9 illustrates the transceiver module 210 configured to receive RF signals from the antenna 910. The third LNA 226 is configured by the control module 240, via control signal 243, to receive an RF signal from the antenna 910 via the second external contact 204, amplify the received RF signal and to output the amplified signal to the receiver 250. The remaining LNAs 220, 223 and the PAs 230, 235 are effectively 'disabled' by the control module 240 via control signals 241, 242, 244, 245.

FIG. 10 illustrates the transceiver module 210 configured to transmit RF signals via the antenna 910. The first PA 230 is configured by the control module 240, via control signal 244, to receive at an input 232 thereof an RF signal to be transmitted, amplify the received RF signal and output to the antenna 910, via the first external contact 202, the amplified signal. The second PA 235 is also configured by the control module 240, via control signal 245, to receive at an input 237 thereof the RF signal to be transmitted, amplify the received RF signal and output to the antenna 910, via the second external contact 204, the amplified signal. The external contacts 202, 204 are operably coupled together, as illustrated, to combine the amplified signals to produce a higher transmit power signal. The LNAs 220, 223, 226 are effectively 'disabled' by the control module 240 via control signals 241, 242, 243.

Thus, as illustrated in FIGS. 9 and 10, the transceiver module 210 is capable of being selectively configured, by way of the control module 240, to transmit and receive RF signals via a single antenna 910, and specifically is able to transmit with a higher transmit power by using the first and second PAs 230, 235 to amplify the signal in a parallel manner. In order to improve the efficiency of the transceiver circuitry, the third LNA 228 may comprise an impedance that is compatible with (e.g. substantially equal with) the first and second PAs 230, 235 when operably coupled in parallel, with respect to the first and second external contacts 202, 204. In this manner, the impedance matching circuit 920 may be configured to match a single (common) impedance (Z1) for both the third LNA 226 and the PAs 230, 235 configured in a parallel manner.

For the receive chain, the LNA optimum impedance may be defined by the LNA input impedance or an intermediate minimum noise impedance, In one example, this impedance may be defined during the design phase and may vary with active device biasing conditions, reactive and passive components, sizing, etc. It is then possible to develop an LNA with improved performance over a wide input impedance range. Nevertheless, to minimize external matching network losses, in one example, the LNA input impedance may be configured to be close to the antenna impedance (say 10 to 200 ohms).

For the transmit chain, the PA impedance is not defined as the output impedance of the PA, but as the optimum impedance to present to the PA, in order to have maximum power transfer with maximum efficiency. As some PAs are configured to work most of the time in an 'on'/'off' switching manner using a pulsed controlled current, the upper limitation may be given by the maximum voltage that can be provided to the load. Given Ohm's law, load impedance, supply voltage and pulsed current value are linked. Thus, it is possible to use a relatively large impedance with a small current, or a low impedance with a large current, where both may be arranged to provide the same power. However, in order to minimize matching network losses, one example embodiment may select a relatively low impedance of, say 10 . . . 200 ohms.

Once the PA has been developed inside the IC, it is possible for the product designer to design the transceiver such that two or more PAs are configured in parallel in order to provide twice (or substantially a factor of) as much current for the same voltage. In this manner, the impedance may be halved, or further reduced for improved/optimum performance. In one example, if a common matching network is used n a configuration that utilises paralleled PAs, another LNA may be incorporated and designed for half impedance.

In one example, the first and second LNAs 220, 223 may be arranged to comprise impedances substantially equal to the impedances of the first and second PAs 230, 235 respectively. In this manner, when the transceiver module 210 is operating in either a single antenna, lower transmit power configuration, such as illustrated in FIGS. 3 and 4, or in a dual-antenna transceiver configuration, such as illustrated in FIGS. 5 to 8, accurate impedance matching between the antenna and the transceiver module 210 may be achieved. Thus, optimum PA impedance, which is typically defined by available supply voltage and PA current source capabilities, may be achieved.

However, when the transceiver module is operating in a single antenna, higher transmit power transceiver configuration, such as illustrated in FIGS. 9 and 10, because the two PAs 230, 235 are configured to operate in parallel, substantially twice as much current will be output to the impedance matching circuit 920, resulting in approximately half the required load impedance provided by the impedance matching circuit 910. As a result, the impedance matching circuit 910 is no longer compatible with the first and second LNAs 220, 223. Accordingly, by providing the third LNA 226 for use during single antenna, higher transmit power transceiver operation, the third LNA 226 may be arranged to be compatible with the lower-load impedance provided by the impedance matching circuit 910; e.g. comprising substantially half the input impedance of the first and second LNAs 220, 223. LNA input impedance is typically defined during the integrated circuit device design phase (e.g. through adjustment of MOS (metal oxide semiconductor) gate size, coil values, bias current, etc.).

Significantly, for the illustrated example, in each transceiver configuration, including the higher transmit power configuration, common external contacts are used for both the transmit and receive chains, thereby substantially avoiding the need for additional valuable external contacts to be utilised.

By arranging the LNAs and the PAs within the transceiver module 210 of the integrated circuit device 200 to be selectively configurable to operate in at least a first, multi-antenna configuration and a second, single antenna higher transmit power configuration, the integrated circuit device 200 is capable of providing transceiver functionality for different transceiver configurations. In particular, the integrated circuit device may provide transceiver functionality within a multi-antenna configuration or a single antenna configuration. For the illustrated example, the integrated circuit device 200 is capable of providing transceiver functionality within a dual-antenna transceiver configuration, a lower transmit power single antenna configuration or a higher transmit power configurations, as described above and illustrated in the accompanying drawings.

In one example, one or more of the following elements of an integrated circuit (or wireless communication unit) may be configured: a logic control of at least one PA, logic control of at least one PA driver circuit, together with incorporating an additional LNA that is configured to be compatible with a paralleled PA network. In a first mode of operation, the integrated circuit may be employed for antenna diversity. In this first mode of operation, a first LNA and a first PA may both be operably coupled to a first antenna element (say of an antenna array) with a second LNA and a second PA operably coupled to a second antenna element. In this manner, antenna diversity may be achieved by transmitting/receiving the same signal via the two respective antenna elements. In a second mode of operation, for example, it is possible to configure an additional LNA to exhibit a lower impedance than the LNAs used in an antenna diversity mode of operation. In this manner, a single antenna element may be used for high-power applications. For example, the additional LNA may be used in a reception mode of the second mode of operation, whereas two or more PAs it may be used concurrently in a transmit mode. In this manner, in the transmit mode of a high-power configuration, it may be possible to approximately double the potential output power of the integrated circuit (or wireless communication unit) when compared to the aforementioned first (antenna diversity) mode of operation.

In this manner, a single integrated circuit device may be developed that is capable of being used within a range of different applications that utilise different transceiver configurations, significantly reducing design and development timescales and costs for such an integrated circuit device.

Significantly, not only does this reduce the cost for such an integrated circuit device, but also the bill of material for a wireless communication unit comprising such an integrated circuit device.

Furthermore, since the integrated circuit device is capable of supporting different transceiver configurations, wireless communication units capable of supporting different transmission technologies, requiring different transceiver configurations, may be provided that differ (in terms of hardware) solely by virtue of the antenna and impedance matching circuit configurations coupled to the integrated circuit device. Significantly, since the same integrated circuit device 200 is able to be used for providing the different transceiver configurations, the remainder of the wireless communication unit 'behind' the integrated circuit device may be duplicated for the different transmission technologies. This significantly reduces the development costs and timescales for such wireless communication devices.

Figure 11:
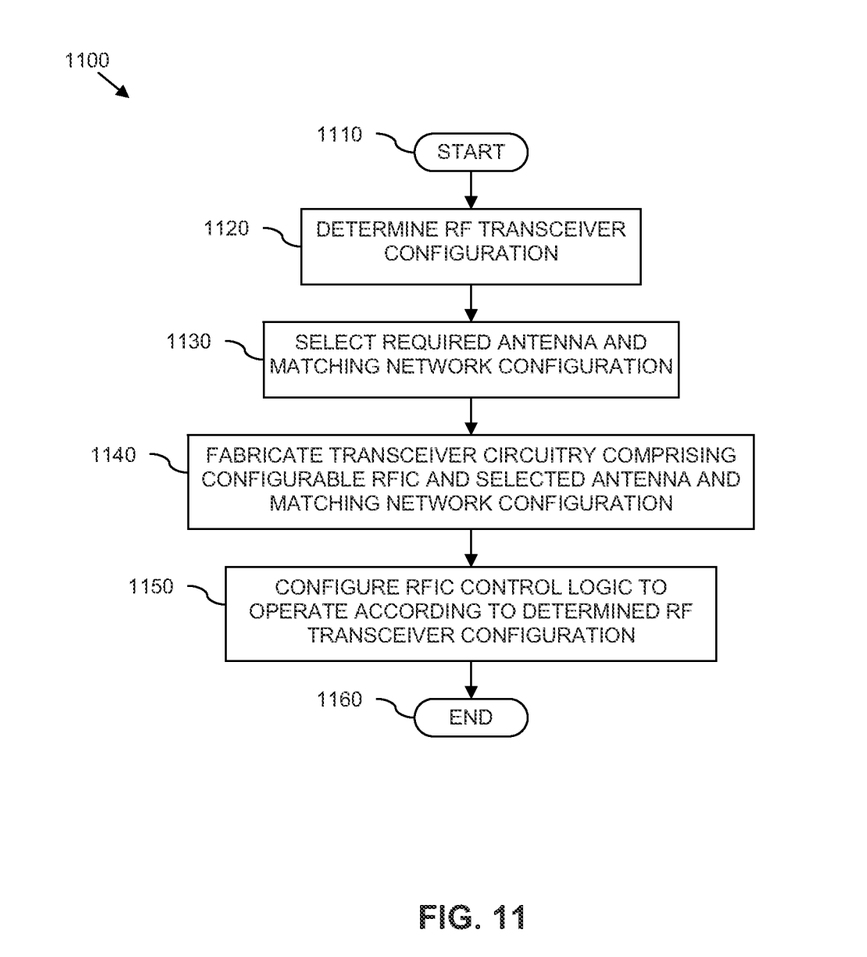
FIG. 11 illustrates an example of a simplified flowchart of a method for manufacturing a wireless communication unit.

Referring now to FIG. 11, there is illustrated an example of a simplified flowchart 1100 of a method for manufacturing a wireless communication device according to some example embodiments, for example as may be implemented for manufacturing the wireless communication units 100 of FIG. 1. The method starts at step 1110, and moves on to step 1120, by determining an RF transceiver configuration for the wireless communication unit. For example, step 1120 may comprise selecting an RF transceiver configuration from a group consisting of:

a dual antenna transceiver configuration;
a single antenna, higher transmit power, transceiver configuration; and
a single antenna, lower transmit power, transceiver configuration.

Next, at step 1130, the method comprises selecting a required antenna and matching network configuration for the determined RF transceiver configuration, for example such as one of the antenna and matching network configurations illustrated in FIGS. 3 to 10. RF transceiver circuitry is then fabricated in step 1140 comprising the selected antenna and matching network configuration, and an integrated circuit device comprising an RF transceiver module configurable to operate in at least a first, multi-antenna configuration and a second, single antenna higher transmit power configuration, such as the integrated circuit device 200 of FIG. 2. Next, at step 1150, the RF transceiver module of the integrated circuit device is then configured to operate according to the determined RF transceiver configuration. The design method then ends at 1160. It will be apparent that the design method may be part of a method of manufacturing an integrated circuit and that after the end of the design method, the integrated circuit may be manufactured in accordance with the artwork for the photomask.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may be implemented at least in part (for example all or part of the control module 240, and/or all or part of the method of FIG. 11) within a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner.

Likewise, single connections carrying multiple signals may be separated out into various different connections carrying subsets of these signals. Therefore, many options exist for transferring signals.

Although specific conductivity types or polarity of potentials have been described and illustrated in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for the illustrated examples, the control module 240, receiver 250, PLL 260 and PA driver 270 have been illustrated as separate logical blocks. However, it will be appreciated that their respective functionality may be distributed and/or consolidated in any suitable alternative manner.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected" or "operably coupled" to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim, The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
    at least one radio frequency (RF) transceiver module, wherein the at least one RF transceiver module comprises
    a plurality of low noise amplifiers (LNAs) having respective input ports operably coupled to at least one external contact of the integrated circuit device and arranged to receive a first RF signal from the at least one external contact and output an amplified received first RF signal, and
    a plurality of power amplifiers (PAs) having respective output ports operably coupled to the at least one external contact of the integrated circuit device, and arranged to receive at respective power amplifier input ports a second RF signal and output an amplified second RF signal to be transmitted, wherein
    the plurality of LNAs and the plurality of PAs are selectively configurable to operate in at least a first, multi-antenna configuration and a second, single antenna high transmit power configuration, wherein the plurality of PAs is selectively configured to operate in the second, single antenna high transmit power configuration by configuring the integrated circuit device such that the second RF signal is amplified by at least two PAs and output to the at least one external contact.

2. The integrated circuit device of claim 1 wherein the plurality of LNAs and the plurality of PAs are selectively configurable to operate in at least one from a group of:
    a multi-antenna transceiver configuration;
    a single antenna, high transmit power, transceiver configuration;
    a single antenna, low transmit power, transceiver configuration.

3. The integrated circuit device of claim 1 wherein, when configured to operate in the first, multi-antenna configuration, the RF transceiver module comprises:
    a first LNA operably coupled at an input thereof to a first external contact of the integrated circuit device, and selectively configurable to receive the first RF signal from the first external contact and output an amplified first RF signal; and a second LNA operably coupled at an input thereof to a second external contact of the integrated circuit device, and selectively configurable to receive the first RF signal from the second external contact and output an amplified first RF signal.

4. The integrated circuit device of claim 1 wherein, when configured to operate in the first, multi-antenna configuration, the RF transceiver module comprises:
   a first PA operably coupled at an output thereof to the first external contact of the integrated circuit device, and selectively configurable to receive at an input thereof the second RF signal to be transmitted and output to the first external contact an amplified second RF signal to be transmitted; and
   a second PA operably coupled at an output thereof to the second external contact of the integrated circuit device, and selectively configurable to receive at an input thereof the second RF signal to be transmitted and output to the second external contact an amplified second RF signal to be transmitted.

5. The integrated circuit device of claim 4 wherein the first LNA and the first PA are arranged to comprise compatible impedances with respect to the first external contact.

6. The integrated circuit device of claim 1 wherein the plurality of LNAs comprise a third LNA operably coupled at an input thereof to at least one of the first and second external contacts of the integrated circuit device and having an input impedance of at least a factor less than other LNAs of the plurality of LNAs.

7. The integrated circuit device of claim 6 wherein the third LNA is selectively configured for use in a receive mode of operation in the second, single antenna high transmit power configuration.

8. The integrated circuit device of claim 1 wherein the third LNA comprises an impedance that is compatible with the first PA and the second PA when operably coupled in parallel thereto, with respect to the first and the second external contacts.

9. The integrated circuit device of claim 1 wherein the RF transceiver module further comprises a control module arranged to selectively configure the plurality of LNAs and the plurality of PAs to operate in at least the first, multi-antenna configuration and the second, single antenna high transmit power configuration.

10. A wireless communication unit comprising the integrated circuit device of claim 1.

11. A method for of generating a design for an integrated circuit for a wireless communication unit, the method comprising:
   determining a radio frequency (RF) transceiver configuration for the wireless communication unit;
   selecting a required antenna and matching network configuration for the determined RF transceiver configuration;
   fabricating RF transceiver circuitry for the integrated circuit comprising a selected antenna and matching network configuration to operate in at least one from a group consisting of:
      a configurable first, multi-antenna configuration, and
      a configurable second single antenna higher transmit power configuration, wherein amplified signals output by a plurality of power amplifiers (PAs) of the integrated circuit are combined to provide a high transmit power signal; and
   configuring the RF transceiver circuitry to operate according to the determined RF transceiver configuration.

12. The method of claim 11, further including manufacturing the integrated circuit in accordance with the design.

* * * * *